US010108128B2

(12) United States Patent
Nagano et al.

(10) Patent No.: US 10,108,128 B2
(45) Date of Patent: Oct. 23, 2018

(54) AUTOMATIC DOCUMENT FEEDER, IMAGE READING DEVICE INCORPORATING THE AUTOMATIC DOCUMENT FEEDER, AND IMAGE FORMING APPARATUS INCORPORATING THE IMAGE READING DEVICE WITH THE AUTOMATIC DOCUMENT FEEDER

(71) Applicants: Tatsuaki Nagano, Kanagawa (JP); Yasunobu Youda, Kanagawa (JP); Satoshi Narai, Kanagawa (JP); Yohei Osanai, Kanagawa (JP); Toshiyuki Horikawa, Kanagawa (JP); Masatoshi Ishida, Kanagawa (JP); Takuji Kawai, Kanagawa (JP)

(72) Inventors: Tatsuaki Nagano, Kanagawa (JP); Yasunobu Youda, Kanagawa (JP); Satoshi Narai, Kanagawa (JP); Yohei Osanai, Kanagawa (JP); Toshiyuki Horikawa, Kanagawa (JP); Masatoshi Ishida, Kanagawa (JP); Takuji Kawai, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/488,853

(22) Filed: Apr. 17, 2017

(65) Prior Publication Data
US 2017/0351209 A1    Dec. 7, 2017

(30) Foreign Application Priority Data

Jun. 6, 2016  (JP) ................................ 2016-112945

(51) Int. Cl.
*B65H 3/44* (2006.01)
*G03G 15/00* (2006.01)
(Continued)

(52) U.S. Cl.
CPC ........... *G03G 15/6529* (2013.01); *B65H 3/44* (2013.01); *B65H 5/26* (2013.01); *G03G 15/6514* (2013.01);
(Continued)

(58) Field of Classification Search
CPC ... B65H 3/44; B65H 3/46; B65H 5/26; G03G 15/6508; G03G 15/6514
See application file for complete search history.

(56) References Cited

U.S. PATENT DOCUMENTS 3,598,396 A * 8/1971 Andrews ................ G06K 13/08
271/111
4,394,008 A * 7/1983 Sugiyama ................ B65H 5/26
271/118
(Continued)

FOREIGN PATENT DOCUMENTS

JP        10-035954        2/1998
JP        10-126569        5/1998
(Continued)

OTHER PUBLICATIONS

U.S. Appl. No. 15/347,179, filed Nov. 9, 2016.
U.S. Appl. No. 15/347,932, filed Nov. 10, 2016.
U.S. Appl. No. 15/348,782, filed Nov. 10, 2016.

*Primary Examiner* — Michael C McCullough
(74) *Attorney, Agent, or Firm* — Harness, Dickey & Pierce P.L.C.

(57) ABSTRACT

An automatic document feeder, which is included in an image reading device and an image forming apparatus, includes first and second document trays, a document output tray, a document conveying passage, multiple document conveying bodies, a drive source, a detector, and a controller. The multiple document conveying bodies include a document holding and conveying body to convey and hold the original document sheet on the second document tray.

(Continued)

On detection of the original document sheet on the second document tray while conveying a different original document sheet from the first document tray, the controller stops feeding the different original document sheet, causes the different original document sheet downstream from the document holding and conveying body in a document conveying direction to be conveyed to the document output tray, and stops the drive source after the different original document has been conveyed to the document output tray.

19 Claims, 9 Drawing Sheets

(51) Int. Cl.
*B65H 5/26* (2006.01)
*H04N 1/00* (2006.01)
*H04N 1/10* (2006.01)

(52) U.S. Cl.
CPC ..... *H04N 1/00588* (2013.01); *H04N 1/00602* (2013.01); *H04N 1/00689* (2013.01); *H04N 1/00824* (2013.01); *H04N 1/1061* (2013.01); *B65H 2701/1914* (2013.01); *B65H 2801/06* (2013.01); *H04N 2201/0081* (2013.01); *H04N 2201/0094* (2013.01)

(56) References Cited

U.S. PATENT DOCUMENTS

| | | | | |
|---|---|---|---|---|
| 4,483,528 | A * | 11/1984 | Takeyama | B65H 7/04 271/110 |
| 5,986,775 | A | 11/1999 | Yoshimizu | |
| 7,806,397 | B2 * | 10/2010 | Wang | B65H 3/44 271/9.01 |
| 2011/0052289 | A1 * | 3/2011 | Ogasawara | B65H 5/26 399/367 |
| 2016/0127590 | A1 | 5/2016 | Hatayama et al. | |
| 2016/0277624 | A1 | 9/2016 | Osanai et al. | |
| 2016/0360073 | A1 | 12/2016 | Hatayama et al. | |
| 2016/0368728 | A1 | 12/2016 | Hirata et al. | |

FOREIGN PATENT DOCUMENTS

| | | |
|---|---|---|
| JP | 10-142849 | 5/1998 |
| JP | 2000-302283 | 10/2000 |

\* cited by examiner

AUTOMATIC DOCUMENT FEEDER, IMAGE READING DEVICE INCORPORATING THE AUTOMATIC DOCUMENT FEEDER, AND IMAGE FORMING APPARATUS INCORPORATING THE IMAGE READING DEVICE WITH THE AUTOMATIC DOCUMENT FEEDER

CROSS-REFERENCE TO RELATED APPLICATION

This patent application is based on and claims priority pursuant to 35 U.S.C. § 119(a) to Japanese Patent Application No. 2016-112945, filed on Jun. 6, 2016, in the Japan Patent Office, the entire disclosure of which is hereby incorporated by reference herein.

BACKGROUND

Technical Field

This disclosure relates to an automatic document feeder having two document sheet trays, an image reading device incorporating the automatic document feeder, and an image forming apparatus incorporating the image reading device with the automatic document feeder.

Related Art

General multifunction printers (MFPs) include an image reading device disposed above the printer, and an automatic document feeder (hereinafter, ADF) disposed above the image reading device. Such ADFs includes one or more image reading methods to read an image formed on an original document sheet. For example, a known image reading device employs two image reading methods, which are a sheet through type in which a fixed reading member reads an image formed on an original document sheet set on a document table that is a first document sheet tray while conveying the original document sheet, and a fixed reading type in which an original document sheet is set on a bypass tray that is a second document sheet tray attached to a side face of the ADF and a fixed image reading member reads an image formed on the original document sheet.

When the original document sheet is set on the second document sheet tray and is then contacted to a scan entrance roller, a bypass document set sensor detects presence of the original document sheet and the scan entrance roller rotates. After having been conveyed to a registration sensor, the original document sheet stops. Thereafter, as a user presses a scan start button on a control panel, an image scanning operation starts to read the image while the original document sheet is being conveyed.

Original document sheets conveyed from the second document sheet tray are mainly plastic cards or thick paper sheets. Such plastic cards and thick paper sheets are different from regular original documents and do not bend or are not easily bendable. Therefore, when the original document sheet that is not flexible or elastic is fed from the first document sheet tray, the original document sheet cannot pass a curved portion to be turned and reversed. By contrast, when the original document sheet is fed from the second document sheet tray, the unbendable hard original document sheet including a plastic card and a thick paper sheet that cannot be fed from the first document sheet tray can be conveyed through the entirely straight path.

However, while the fixed reading member is reading an image formed on an original document sheet set to the first document sheet tray is being conveyed, when a different original document sheet set on the second document sheet tray is fed, these original document sheets contact with each other, resulting in a paper jam.

In order to avoid such collision of multiple original document sheets in the image reading device, when an original document sheet is set to the second document sheet tray during regular document conveyance from the first document sheet tray, the bypass document set sensor is turned on, and document conveying rollers is stopped driving. Then, the conveyance of the original document sheet conveyed from the first document sheet tray is controlled to stop as a document paper jam.

SUMMARY

At least one aspect of this disclosure provides an automatic document feeder including a first document tray, a second document tray, a document feeding body, a document output tray, a document conveying passage, multiple document conveying bodies, a drive source, a detector, and a controller. The first document tray and the second document tray are configured to load an original document sheet thereon. The document feeding body is configured to feed the original document sheet one by one from the first document tray. The document output tray is configured to receive the original document sheet output thereto. The original document sheet travels through the document conveying passage from the first document tray to the document output tray. Each of the multiple document conveying bodies is disposed in the document conveying passage and configured to convey the original document sheet in the document conveying passage. The drive source is configured to drive the multiple document conveying bodies. The detector is configured to detect that the original document sheet is loaded on the second document tray. The controller is configured to control the drive source. The second document tray loads a single original document sheet thereon. The multiple document conveying bodies includes a document holding and conveying body that is disposed near the second document tray and that is configured to convey the original document sheet in the document conveying passage and to hold the original document sheet loaded on the second document tray. On detection of the original document sheet loaded on the second document tray by the detector during document conveyance of a different original document sheet from the first document tray, the controller configured to (1) stop a document feeding operation of the different original document sheet from the first document tray, (2) cause the multiple document conveying bodies to convey the different original document sheet downstream from the document holding and conveying body in a document conveying direction to the document output tray, and (3) stop driving the drive source after the different original document has been conveyed to the document output tray.

Further, at least one aspect of this disclosure provides an image reading device including the above-described automatic document feeder.

Further, at least one aspect of this disclosure provides an image forming apparatus including the above-described image reading device and an image forming device configured to form an image based on image data read by the above-described image reading device.

DETAILED DESCRIPTION

Figure 1:
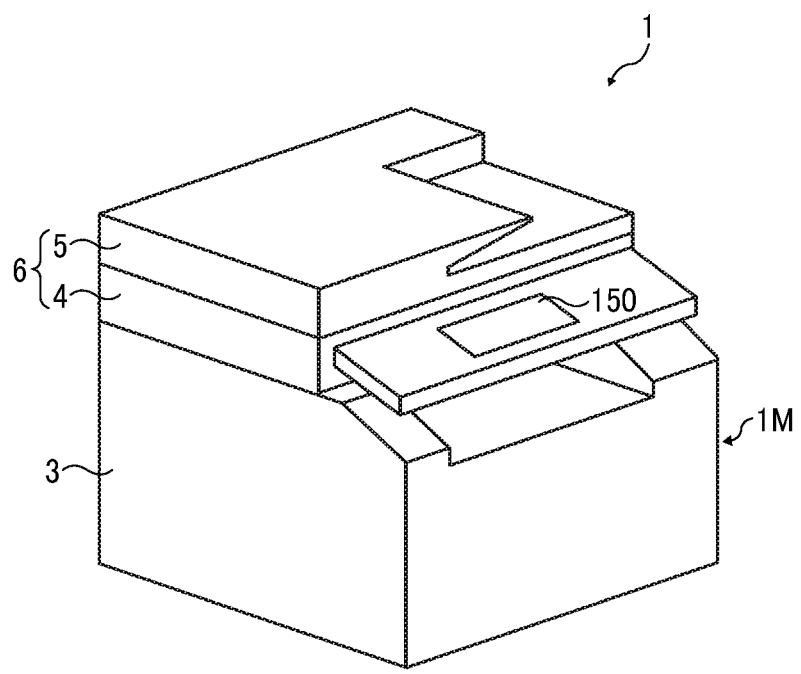
FIG. 1 is a perspective view illustrating a schematic configuration of an image forming apparatus according to an embodiment of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Descriptions are given of an example applicable to an image reading device and an image forming apparatus incorporating the image reading device, with reference to the following figures.

Referring now to the drawings, wherein like reference numerals designate identical or corresponding parts throughout the several views, in particular to FIG. 1, an image forming apparatus 1 according to an embodiment of this disclosure is explained.

It is to be noted that identical parts are given identical reference numerals and redundant descriptions are summarized or omitted accordingly.

The image forming apparatus 1 may be a copier, a facsimile machine, a printer, a multifunction peripheral or a multifunction printer (MFP) having at least one of copying, printing, scanning, facsimile, and plotter functions, or the like. According to the present example, the image forming apparatus 1 is an electrophotographic copier that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying path to a downstream side thereof; the term "width direction" indicates a direction basically perpendicular to the sheet conveying direction.

FIG. 1 is a perspective view illustrating a schematic configuration of the image forming apparatus 1 according to an embodiment of this disclosure.

As illustrated in FIG. 1, the image forming apparatus 1 according to the present embodiment of this disclosure includes an image forming device 3 and an image scanner 4, and an automatic document feeder (ADF) 5 that is disposed on a housing 1M of the image forming apparatus 1. The image forming apparatus 1 in this disclosure corresponds to a copier.

The image forming device 3 includes multiple photoconductor drums, respective developing devices, a transfer belt, a secondary transfer body, and a fixing device. The developing devices develop toner images by supplying respective colors of cyan (C), magenta (M), yellow (Y), and black (K). Based on image data obtained by the image reading device 6 or an external computer, a laser light beam is emitted from, for example, an exposure device to a charged surface of each photoconductor drum, so as to form an electrostatic latent image on the surface of the photoconductor drum. Then, each developing device supplies toner onto the electrostatic latent image formed on the surface of each photoconductor drum, thus developing (visualizing) the electrostatic latent image into a visible toner image. Further, the image forming device 3 causes the visible formed on the photoconductor drums to be primarily transferred onto the transfer belt. Then, the toner image is secondarily transferred onto a recording medium. Thereafter, the fixing device fixes the toner image to the recording medium by application of heat and pressure to form a color image on the recording medium.

Figure 2:
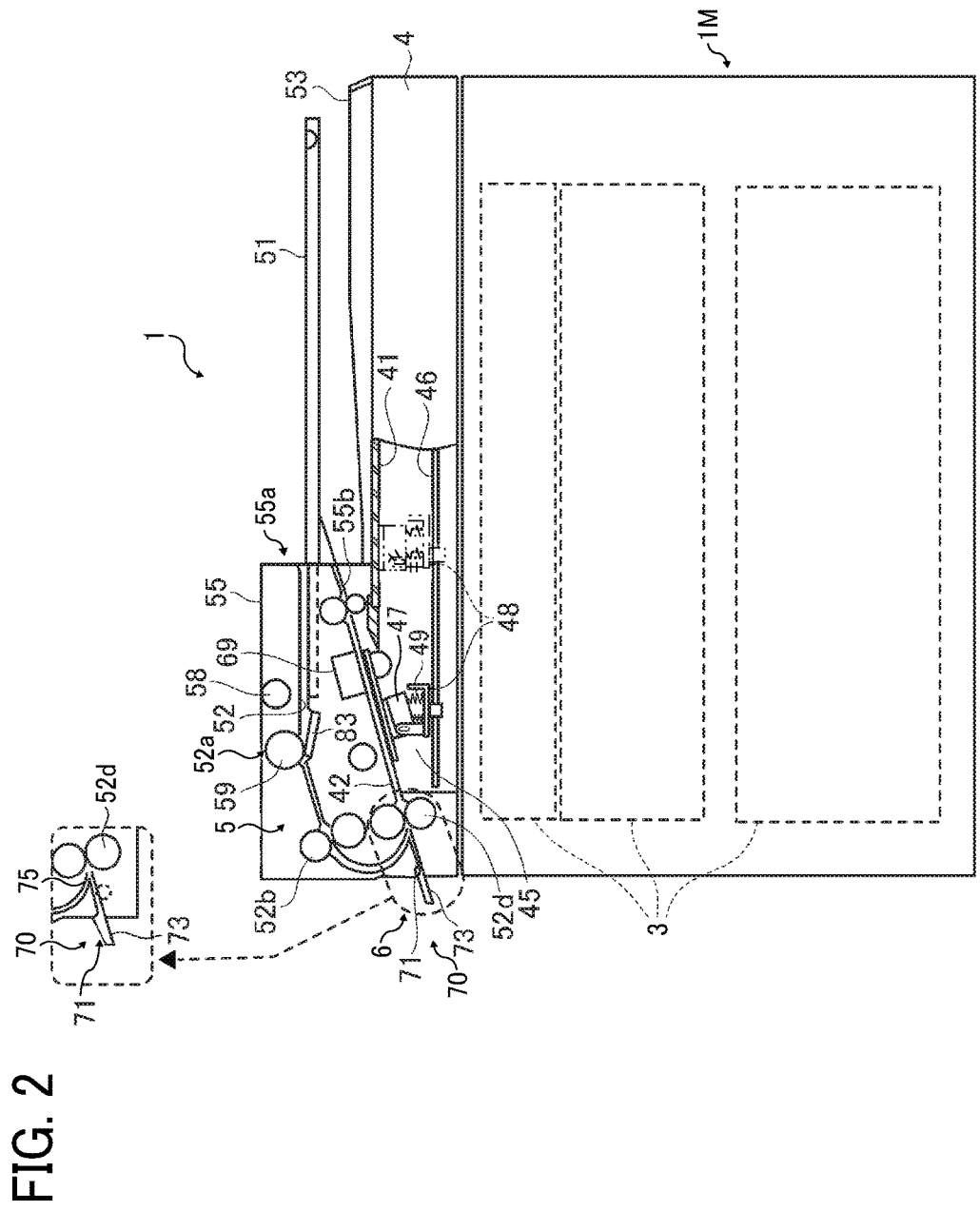
FIG. 2 is a cross sectional view illustrating the image forming apparatus according to an embodiment of this disclosure.

Next, a description is given of a configuration of the image reading device 6 including the ADF 5, with reference to FIG. 2.

FIG. 2 is a cross sectional view illustrating the image forming apparatus 1 according to an embodiment of this disclosure.

The image reading device 6 performs an image reading operation by switching between a DF scanner mode (a mobile original document reading mode) and a flatbed scanner mode (a flatbed scanner mode). In the DF scanner mode, the image on the original document sheet is read while the original document sheet is conveyed automatically by the ADF 5. In the flatbed scanner mode, the image reading device 6 reads the image of the original document sheet loaded on the flatbed scanner mode.

In the flatbed scanner mode, the image scanner 4 emits light to the image side of the original document sheet (for example, an original document sheet, a thick paper, and a book) placed on a flatbed exposure glass 41. Then, the image scanner 4 converts the reflection light reflected on the image side of the original document sheet to an image signal. By so doing, the image formed on the original document sheet can be read.

In the DF scanner mode, the ADF 5 separates an original document sheet S of a bundle of original document sheets loaded on an original document tray 51 one by one and conveys the original document sheet S to an original document conveying passage 52. The original document tray 51 functions as an original document loading table and as a first original document tray. As the original document sheet S is conveyed in an document conveying direction, the leading end of the original document sheet S first comes to the downstream side of the document conveying direction. While being conveyed, the original document sheet S is brought to face a DF exposure glass 42. That is, the original document sheet S passes sequentially from the leading end to the trailing end over the upper face side of the DF exposure glass 42 that is a predetermined document reading position of the image scanner 4. Specifically, by sequentially reading the image formed on the original document sheet S that is conveyed by the ADF 5 and passes over the DF exposure glass 42 of the image scanner 4, the image reading device 6 can exert a function of the DF scanner.

It is to be noted that the ADF 5 is attached to a rear part (a back side) of an upper face side of the housing 1M via an opening and closing mechanism such as a hinge or hinges. Consequently, the ADF 5 moves between an open position at which the flatbed exposure glass 41 is open relative to the housing 1M and a closed position at which the ADF 5 presses an original document sheet S placed on the flatbed exposure glass 41.

Figure 3:
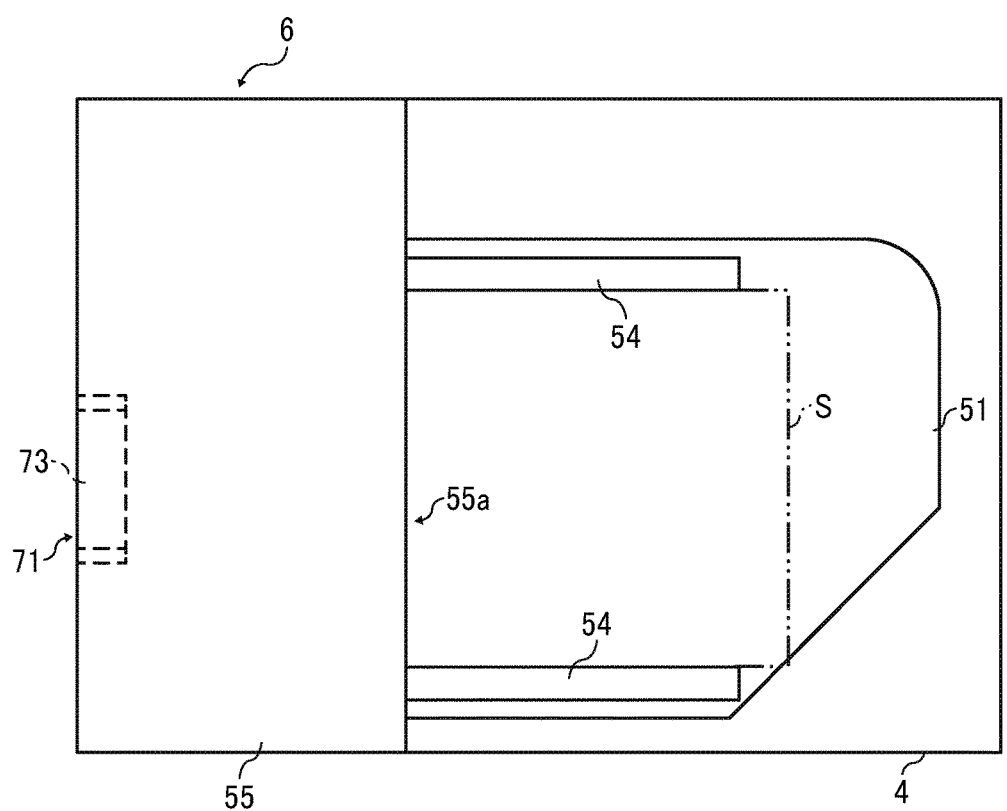
FIG. 3 is a top view illustrating a document sheet tray included in the image forming apparatus according to an embodiment of this disclosure.

FIG. 3 is a top view illustrating the original document tray 51.

As illustrated in FIG. 3, the original document tray 51 is provided with a pair of side guide plates 54. The pair of side guide plates 54 is a movable pair of right and left guide plates to position the original document sheet S set in the ADF 5 in a sheet width direction perpendicular to the document feeding direction of the original document sheet S. The pair of side guide plates 54 functions as a pair of guide plates disposed relatively separable and closable to each other in the width direction of the original document tray 51 so as to match the original document tray 51 and a reference position in the width direction of the original document sheet S. However, the function of the pair of side guide plates 54 is not limited thereto. For example, one plate of the pair of side guide plates 54 may be disposed fixedly on the original document tray 51. In this case, one end of the original document sheet S is contacted to one end of the fixed plate of the side guide plates 54 and a movable plate of the pair of the side guide plates 54 moves to contact the opposite end of the original document sheet S.

A cover 55 is disposed openably closable to cover at least an upper side of the ADF 5. The cover 55 includes a document inlet port 55a that is disposed at an upper part of a feeding side end portion of the original document tray 51 so as to guide the leading end of the original document sheet S into an inner side of the cover 55. The cover 55 also covers an upper part of the leading end side of the original document tray 51 so that the leading end side of the original document tray 51 is positioned inside or downstream from the document inlet port 55a in the document conveying direction. Further, the ADF 5 defines the original document conveying passage 52 extending from the document inlet port 55a to a document outlet port 55b. A main guide part that forms a conveying path of the original document conveying passage 52 is defined by a rib formed by the cover 55.

Figure 4A:
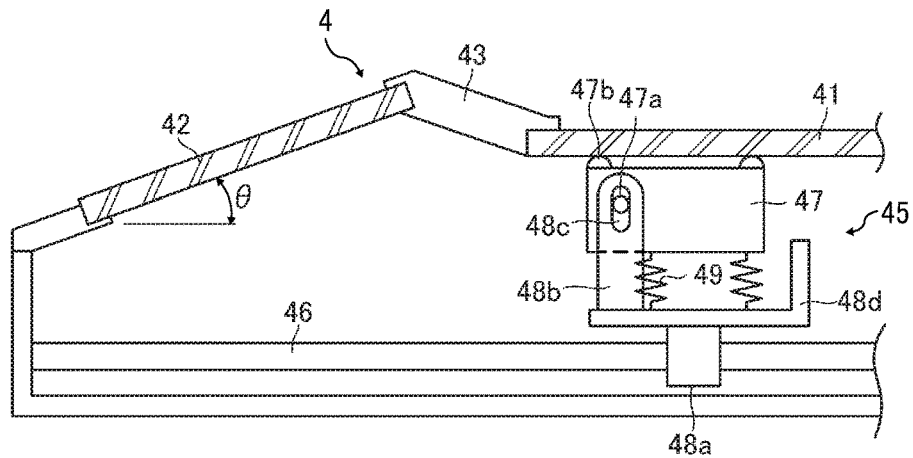
FIGS. 4A, 4B, and 4C are diagrams illustrating an image reading part of an image reading device according to an embodiment of this disclosure.
Figure 4B:
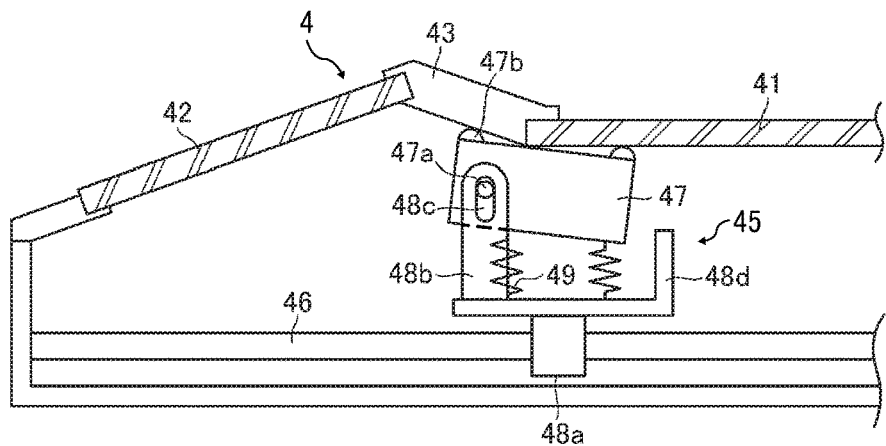
Figure 4C:
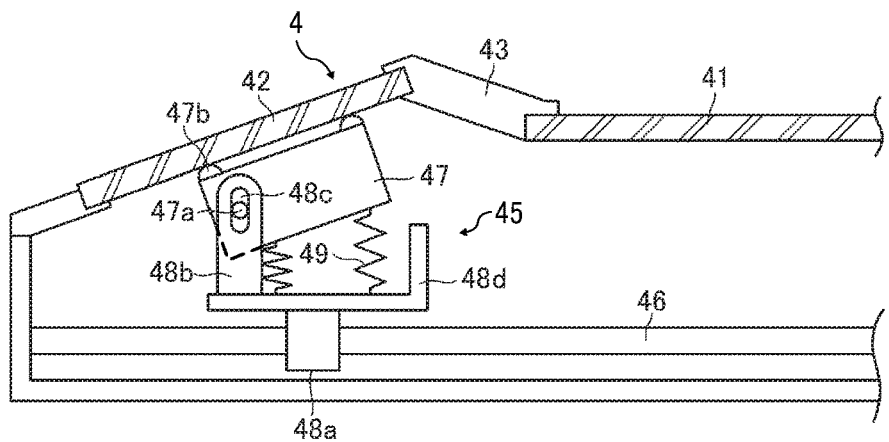

Next, a description is given of a scanning unit used in the image reading device 6, with reference to FIGS. 4A, 4B, and 4C.

FIGS. 4A, 4B, and 4C are diagrams illustrating an image reading part of the image reading device 6.

The flatbed exposure glass 41 is designed to face the image formed face of the original document S when the image reading device 6 functions as a flatbed scanner and the original document sheet S to be read is loaded on the flatbed exposure glass 41. Further, the DF exposure glass 42 is designed to face the image formed face of the original document sheet S that passes a predetermined scanning position of the original document conveying passage 52 when the image reading device 6 functions as a DF scanner. Further, as illustrated in FIG. 4A, the DF exposure glass 42 is tilted at a predetermined angle of inclination θ relative to the flatbed exposure glass 41.

The image scanner 4 includes a first document scanning unit 45 (a document scanning unit) and a guide rod 46 that extends in a horizontal direction, that is, a left-and-right direction in FIGS. 4A through 4C. The first document scanning unit 45 includes a single unit optical scanning unit 47, a bracket 48, and multiple compression coil springs (elastic members) 49. The bracket 48 supports the single unit optical scanning unit 47. The multiple compression coil springs 49 are assembled in a compressed state between the single unit optical scanning unit 47 and the bracket 48.

The single unit optical scanning unit 47 functions as a contact image sensor that includes, for example, a mold frame and optical components such as a unity magnification imaging device roof mirror lens array, a light path separation mirror, a unity magnification image sensor, and an illumination light source. The single unit optical scanning unit 47 can perform line scanning of an image with high resolution in the main scanning direction. Further, the single unit optical scanning unit 47 has a large focal depth that can be applied to image reading of book type original documents.

It is to be noted that the single unit optical scanning unit 47 is not limited to a specific configuration but can have any configuration that is applicable to the DF scanner mode and the flatbed scanner mode. It is to be noted that the main scanning direction indicates a direction parallel to both an upper face of the flatbed exposure glass 41 and the upper face of the DF exposure glass 42.

The bracket 48 includes a lower slider portion 48a, a pair of holder arms 48b, and a bracket body 48d. The lower slider portion 48a is supported by the guide rod 46. The holder arm 48b holds the single unit optical scanning unit 47. The lower slider portion 48a and the holder arm 48b are attached to the bracket body 48d as a single unit. The lower slider portion 48a has a cylindrical body fixed to the lower face of the bracket body 48d at the center in a longitudinal direction of the bracket body 48d. Each of the holder arms 48b is formed by a plate disposed projecting upwardly at the center of the bracket body 48d in FIGS. 4A, 4B, and 4C. End projecting portions 47a project outwardly and vertically from both end faces of the single unit optical scanning unit 47. Both of the pair of holder arms 48b include respective oval openings 48c that axially extend from the single unit optical scanning unit 47 in a direction perpendicular to both axial side faces of the single unit optical scanning unit 47. The respective oval openings 48c support the end projecting portions 47a so that the end projecting portions 47a can rotate about a longitudinal axis and change the position in the vertical direction.

The multiple compression coil springs 49 presses the lower face of the single unit optical scanning unit 47 upwardly at multiple portions in the main scanning direction of the image forming apparatus 1 at a side of the flatbed exposure glass 41 and a side of the DF exposure glass 42.

Further, an upper slider portion 47b is attached to an upper face of the single unit optical scanning unit 47. The upper slider portion 47b has a rectangular ring-shaped body and smoothly slides in the sub-scanning direction while contacting the lower face of at least one of the flatbed exposure glass 41 and the DF exposure glass 42.

It is to be noted that the upper slider portion 47b may be projections that extend in a longitudinal direction or a lateral direction of the single unit optical scanning unit 47 and separate from each other in a direction perpendicular to the longitudinal direction or the lateral direction. It is also to be noted that the upper slider portion 47b may include multiple hemispherical projections.

In any of the above-described configurations, it is preferable that the upper slider portion 47b includes a material that can smoothly move on the lower face of the flatbed exposure glass 41 and the lower face of the DF exposure glass 42 or other guiding surface such as a guiding member 43 with low frictional coefficient without lubrication.

The single unit optical scanning unit 47 is guided to be freely movable in the sub-scanning direction by the guide rod 46 disposed at the lower side of the bracket 48. The single unit optical scanning unit 47 is slidably moves to that the upper part of the single unit optical scanning unit 47 contacts one or both of the flatbed exposure glass 41 and the DF exposure glass 42 according to the position of the single unit optical scanning unit 47 in the sub-scanning direction. Accordingly, the first document scanning unit 45 is regulated in the tilt about the shaft of the guide rod 46 while being freely movable along the guide rod 46.

The first document scanning unit 45 performs line scanning of an image formed on the original document sheet S placed on the flatbed exposure glass 41 and moves in the sub-scanning direction simultaneously. By so doing, the first document scanning unit 45 reads the image formed on the original document sheet S. In addition, the first document scanning unit 45 performs line scanning of the image formed on the original document sheet S passing over the DF exposure glass 42 in the main scanning direction. By so doing, the first document scanning unit 45 reads the image of the original document sheet S.

It is to be noted that the image scanner 4 includes a timing belt having an endless loop inside a housing thereof. The bracket 48 of the first document scanning unit 45 is fixed to a portion on the endless loop of the timing belt in the circumferential direction thereof.

Further, the image scanner 4 includes multiple timing pulleys and a motor. The timing belt is wound and stretched around the multiple timing pulleys without sagging. The motor drives to rotate one of the multiple timing pulleys.

When reading an image in the flatbed scanner mode, the first document scanning unit 45 moves in the sub-scanning direction toward one side of the flatbed exposure glass 41 (i.e., toward a right side direction in FIG. 2), separating from a home position Pa that is close to a stop position depicted by a broken line in FIG. 2. Then, as the first document scanning unit 45 moves continuously by a minute range (a very small range) in the main scanning direction that is a direction perpendicular to the sub-scanning direction, the single unit optical scanning unit 47 performs line scanning of the original document sheet S to read the image formed on the front face (the lower face) of the original document sheet S placed on the flatbed exposure glass 41. After the line scanning is finished, the first document scanning unit 45 returns to the home position Pa.

When reading an image in the DF scanner mode, the first document scanning unit 45 moves in the sub-scanning direction, from the home position Pa toward a lower side of the DF exposure glass 42, as indicated by a solid line in FIG. 2. That is, the first document scanning unit 45 moves in the sub-scanning direction from the home position Pa toward the opposite side (a left side in FIG. 2) by a predetermined distance, and then stops at the DF scanning position Pb at the lower side of the DF exposure glass 42. Thereafter, the first document scanning unit 45 reads the image formed on the front face of the original document sheet S passing on the DF exposure glass 42.

As described above, the first document scanning unit 45 is movable in the sub-scanning direction so as to be located on the lower side of the flatbed exposure glass 41 and the lower side of the DF exposure glass 42. Further, according to the location of the first document scanning unit 45 in the sub-scanning direction, the single unit optical scanning unit 47 changes the attitude between a first scanning attitude that is a horizontal position to read an image through the whole length of the flatbed exposure glass 41 as illustrated in FIG. 4A, a second scanning attitude that is the inclined position to read an image through the whole length of the DF exposure glass 42 as illustrated in FIG. 4C, and an intermediate position as illustrated in FIG. 4B.

The ADF 5 includes the original document tray 51, the original document conveying passage 52, and an original document output tray 53. The original document tray 51 functions as an original document loading table on which a standard size original document sheet S is loaded. The original document conveying passage 52 functions as a sheet conveying passage in which an original document sheet S can be read during conveyance. The original document output tray 53 stacks the original document S after the image of the original document S is read.

It is to be noted that, in order to achieve a reduction in size, the original document tray 51 and the original document output tray 53 are disposed vertically separated from each other with part of the original document tray 51 and the original document output tray 53 disposed vertically overlapping at least in a planar view.

Next, a description is given of the original document conveying passage 52 through which the original document sheet S is conveyed after the original document sheet S has been reversed.

Figure 5:
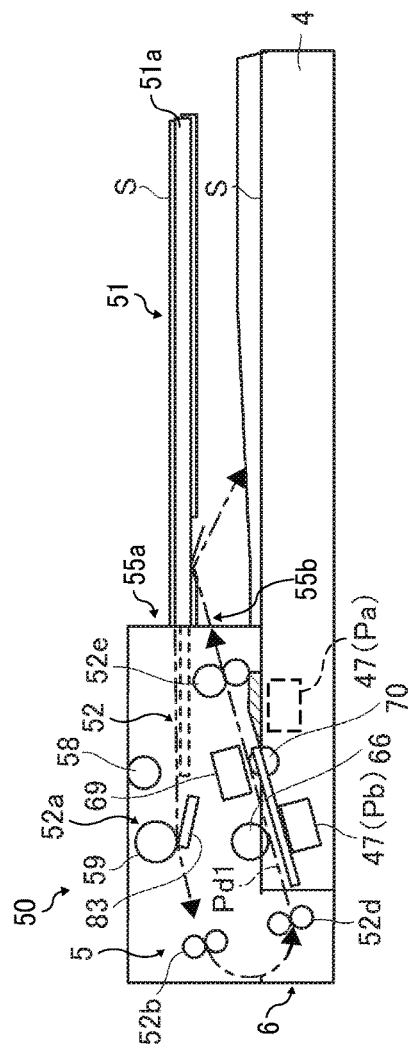
FIG. 5 is a diagram illustrating an original document conveying passage having a U-turn conveying passage in an automatic document feeder according to an embodiment of this disclosure.

FIG. 5 is a diagram illustrating a U-turn conveying passage in the ADF 5 according to an embodiment of this disclosure.

As illustrated in FIG. 5, the ADF 5 includes a document separation unit 52a that separates an uppermost original document sheet S placed on a bundle of original document sheets S loaded on an original document table 51a of the original document tray 51 one by one and conveys the uppermost original document sheet S to the original document conveying passage 52 that includes a curved portion where the uppermost original document sheet S is reversed and conveyed. The document separation unit 52a includes a document feed roller 59 and a separation panel 83 disposed facing each other and forms a document feeding unit. Further, the ADF 5 conveys the original document sheet S separated and fed via the original document tray 51 through the original document conveying passage 52 by causing the original document sheet S to be turned and reversed, so that the original document sheet S passes through an original document scanning position Pd1 (a specific operation performing position) along a top face of the DF exposure glass 42.

The original document conveying passage 52 is provided with multiple document conveying rollers, which are a pickup roller 58, the document feed roller 59, a pair of pullout rollers 52b, a pair of scan entrance rollers 52d, a first scanning roller 66, and a second scanning roller 70. The original document conveying passage 52 is also provided with a pair of document output rollers 52e disposed downstream from these document conveying rollers in the document conveying direction.

It is to be noted that the number of the multiple document conveying rollers for reversing and ejecting the original document sheets S and the positions of the multiple document conveying rollers can be freely determined according to setting conditions of the original document conveying passage 52 and the length in the document conveying direction of the smallest original document sheet S. Further, the multiple document conveying rollers are driven by a conveyance drive motor 82 that functions as a drive source.

The pickup roller 58, the document feed roller 59, the pair of pullout rollers 52b, the pair of scan entrance rollers 52d, the first scanning roller 66, the second scanning roller 70, and the pair of document output rollers 52e form multiple document conveying units according to this disclosure.

As previously described, the first document scanning unit 45 includes the single unit optical scanning unit 47. When the single unit optical scanning unit 47 is located at the position Pb as indicated by letter "47 (Pb)" in FIG. 5, that is, at a position indicated with a solid line in FIG. 2, the single unit optical scanning unit 47 of the first document scanning unit 45 repeatedly performs line scanning of an image on the original document sheet S at the scanning position Pd1. By so doing, the first document scanning unit 45 can read the image formed on the original document sheet S. After the image on the original document S has been read, the original document sheet S is output onto the original document output tray 53 via the pair of document output rollers 52e. The document separation unit 52a, the pair of pullout rollers 52b, the first scanning roller 66, the second scanning roller 70, and the pair of document output rollers 52e form a document conveying device 50, together with the multiple sensors provided to the original document conveying passage 52 and a controller that controls conveyance of original document sheets based on detection results obtained by the multiple sensors.

The document conveying device 50 conveys the original document sheet S from the original document table 51a of the original document tray 51. At the same time, the document conveying device 50 reverses the original document sheet S by making a turn in the original document conveying passage 52 so as to cause the original document sheet S to pass the scanning position Pd1. Then, the document conveying device 50 discharges the original document sheet S within a stacking area on the original document output tray 53 that is a document discharging area outside the original document table 51. The multiple sensors disposed along the original document conveying passage 52 are, for example, known sheet proper position sensors, document contact sensors, document width sensors, scan entrance sensors, registration sensors, output sensors and so forth. These sensors are disposed serially from the upstream side to the downstream side along the document conveying direction. Certainly, the regular original document sheet S corresponds to a plain paper copy (PPC) sheet or other easily bendable sheet having an image recordable side.

The original document conveying passage 52 includes a straight conveying passage 61 that extends in an inclined manner along the DF exposure glass 42 in a predetermined conveyance section from a nip position of the pair of scan entrance rollers 52d disposed at the upstream side of the DF exposure glass 42 to the original document output tray 53. This predetermined conveyance section corresponds to a main part of the straight conveying passage 61.

Next, a description is given of the straight conveying passage 61 through which the original document sheet S is conveyed relatively linearly.

Figure 6:
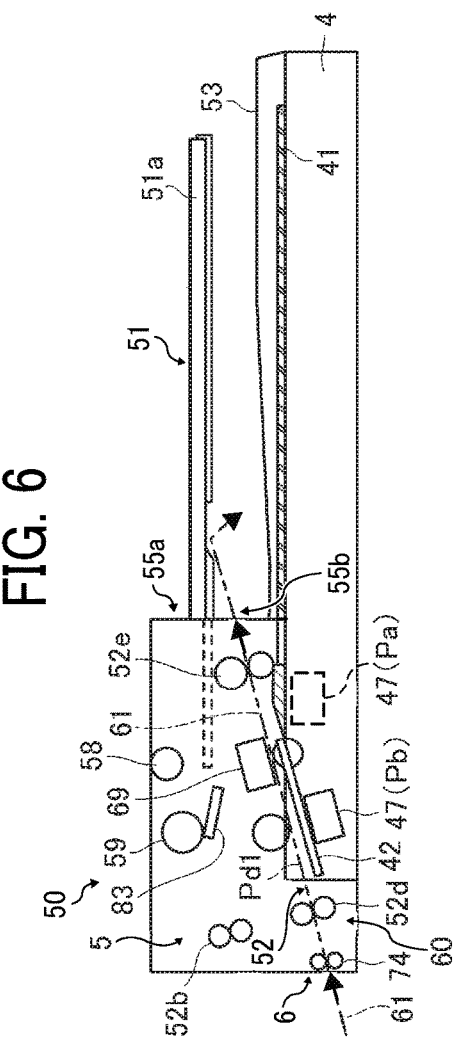
FIG. 6 is a diagram illustrating the original document conveying passage having a straight conveying passage in the automatic document feeder according to an embodiment of this disclosure.

FIG. 6 is a diagram illustrating the straight conveying passage 61 in the ADF 5 according to an embodiment of this disclosure.

As illustrated in FIG. 6, the straight conveying passage 61 is a sheet conveying passage through which a hard sheet having a flexural rigidity higher than a regular original document sheet is conveyed. Specifically, when an image formed on a hard sheet, such as a small-size hard sheet H, is read, the hard sheet H is inclined relative to a plane to be parallel to the upper face of the DF exposure glass 42. Further, the hard sheet H passes a predetermined scanning position Pd1 on the DF exposure glass 42 when being conveyed through the straight conveying passage 61.

Small size hard sheets H may be standard size cards formed by resin (or thick paper) such as driving license cards, ID cards (identification cards), and travel cards. Therefore, a small size card described herein corresponds to a card, for example, having a size of any one of ID-1, ID-2, and ID-3 of ISO/IEC7810 that is an international standard that regulates the shapes of an identification card or a card having the substantially same size as the above-described card. However, the width in the lateral direction of the small-side card is set to be smaller than the width in the lateral direction of the smallest size cut sheet of multiple standard cut sheet sizes that are settable on the original document tray 51.

The pair of scan entrance rollers 52d, the first scanning roller 66, the second scanning roller 70, and the pair of document output rollers 52e of the straight conveying passage 61 form a second document conveying portion 60, together with the multiple sensors provided to the straight conveying passage 61 and the controller that controls conveyance of original document sheet based on detection results obtained by the multiple sensors. Therefore, the straight conveying passage 61 is a second document conveying passage through which the small-size hard sheet H is conveyed. Specifically, when an image formed on the small-size hard sheet H is read, the small-size hard sheet H is inserted from one end side of the straight conveying passage 61, is conveyed through the straight conveying passage 61, and is ejected from the other end side of the straight conveying passage 61. The other end side of the straight conveying passage 61 is located in an original document ejecting area.

Figure 7:
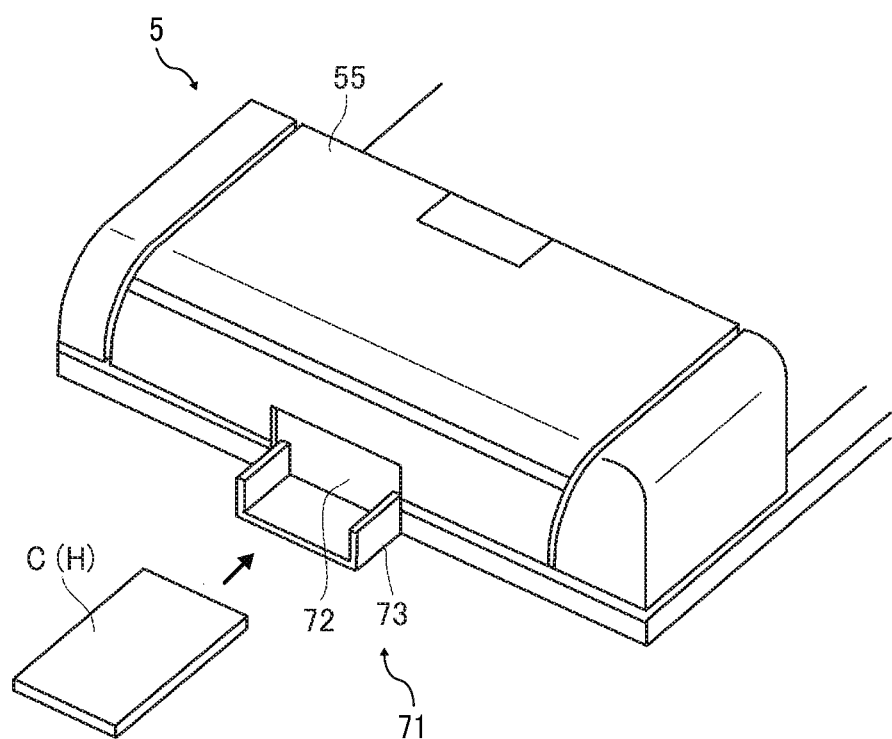
FIG. 7 is a perspective view illustrating a bypass tray of a card supplying portion of the automatic document feeder according to an embodiment of this disclosure.
Figure 8A:
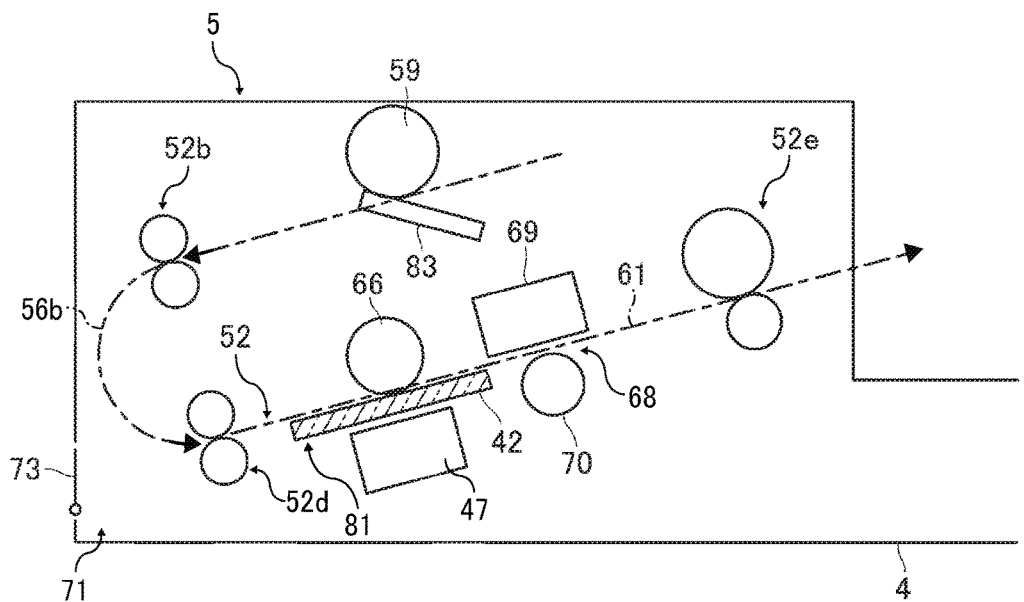
FIG. 8A is a diagram illustrating document reversing conveyance operations of an original document sheet via the U-turn conveying passage of the original document conveying passage in the automatic document feeder according to an embodiment of this disclosure.
Figure 8B:
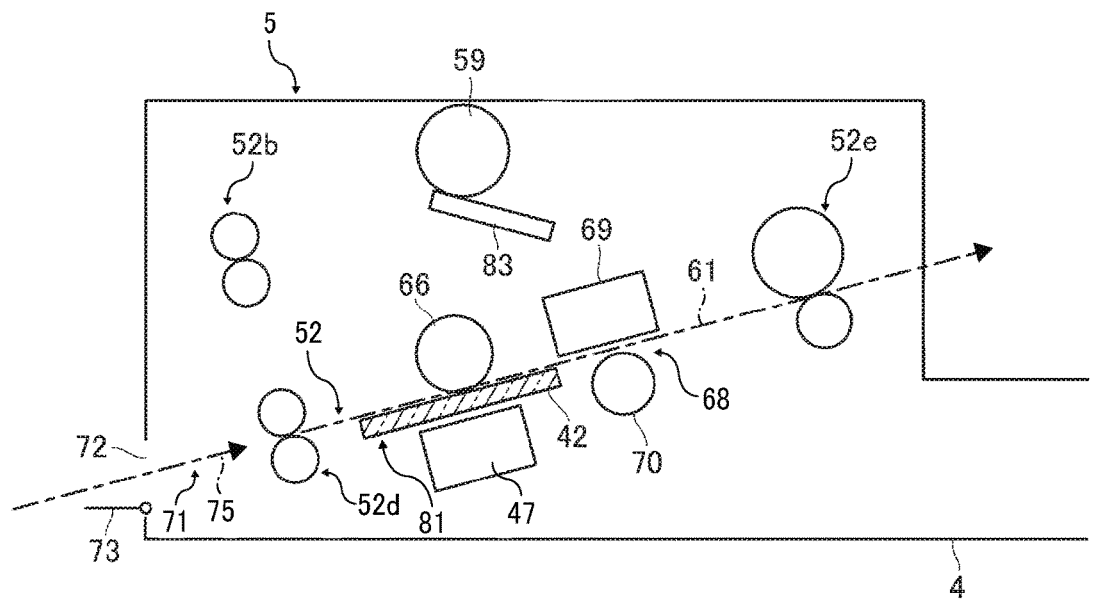
FIG. 8B is a diagram illustrating another document reversing conveyance operations of the original document sheet via the straight conveying passage of the original document conveying passage in the automatic document feeder according to an embodiment of this disclosure.

FIG. 7 is a perspective view illustrating a bypass tray 73 of a card supplying portion 71 of the ADF 5 according to an embodiment of this disclosure. FIG. 8A is a diagram illustrating sheet feeding operations of the original document sheet S via the U-turn conveying passage 56b of the original document conveying passage 52 in the ADF 5. FIG. 8B is a diagram illustrating another sheet feeding operations of the original document sheet S via the straight conveying passage 61 of the original document conveying passage 52 in the ADF 5.

As illustrated in FIG. 7, the ADF 5 includes the card supplying portion 71.

The card supplying portion 71 includes a document feeding port 72, the bypass tray 73, the pair of scan entrance rollers 52d, and a card conveying passage 75.

The bypass tray 73 is generally in a closed state. In the closed state, the bypass tray 73 functions as a part of a side face of the cover 55. As illustrated in FIGS. 7, 8A and 8B, the bypass tray 73 is rotatably supported so that the document feeding port 72 can open. When the bypass tray 73 is in the closed state, the bypass tray 73 functions as part of a sheet transfer guide of the original document sheet S that is a regular original document.

When the small-size hard sheet H, in this case, a card C is set on the loading face of the bypass tray 73, a card entrance roller 74 and the pair of scan entrance rollers 52d pick up the card C and supplies the card C to the card conveying passage 75 via the document feeding port 72. The card conveying passage 75 is a document conveying passage that extends in a downwardly inclined manner from the document feeding port 72. The card conveying passage 75 merges the original document conveying passage 52 at the upstream side of the DF exposure glass 42.

At this time, the card conveying passage 75 is arranged to have an angle of inclination along with the downward inclination of the DF exposure glass 42. That is, in a range of from the document feeding port 72 to the DF exposure glass 42, the card conveying passage 75 extends at the same angle of inclination of the DF exposure glass 42 to be on the same flat plane as the DF exposure glass 42. According to this configuration, the card conveying passage 75 and the straight conveying passage 61 are located on the same plane along the angle of inclination of the DF exposure glass 42 over the whole range of from the document feeding port 72 to the document outlet port 55b.

The original document conveying passage 52 includes a set feeler that is located at an upstream end of the document inlet port 55a in the document conveying direction of the original document sheet S, that is, at the upper part of the leading end of the original document tray 51. The set feeler rotates along with loading of the original document sheet S. The original document conveying passage 52 includes the pickup roller 58 and a document feeding unit including the document feed roller 59 and the separation panel 83. The pickup roller 58 is disposed inside from the document inlet port 55a. The document feed roller 59 and the separation panel 83 are disposed facing each other with the original document conveying passage 52 interposed therebetween. The pickup roller 58 picks up some original document sheets S (ideally, one original document sheet S) from top of a bundle of original document sheets S loaded on the original document tray 51 at a contact position.

The document feed roller 59 is rotatable in the document conveying direction. When multiple original document sheets S are to be fed, the separation panel 83 applies resistance to the original document sheets S other than the uppermost original document sheet S in a rotational direction of the document feed roller 59. By so doing, multifeed of the original document sheets S is prevented.

It is to be noted that the document feed roller 59 may be any other member such as a belt and a roller that rotates in a direction opposite the rotational direction of a sheet feed roller (or a sheet feed belt).

The original document conveying passage 52 is provided with multiple pairs of document conveying rollers having two rollers disposed facing each other with the original document conveying passage 52 interposed therebetween. Specifically, the pairs of document conveying rollers include the pair of pullout rollers 52*b*, the pair of scan entrance rollers 52*d*, and the pair of document output rollers 52*e*.

It is to be noted that the number of the pairs of document conveying rollers and the positions of the pairs of document conveying rollers can be freely determined, for example, according to layout of the original document conveying passage 52 and the length in the document conveying direction of the original document sheet S having the smallest size applicable to the ADF 5.

It is to be noted that the pair of pullout rollers 52*b* disposed adjacent to and downstream from the document feed roller 59 includes a leading end alignment mechanism in which skew of the original document sheet S during the conveyance is corrected according to a drive timing of the pickup roller 58 by causing the leading end of the fed original document sheet S to be abutted against the pair of pullout rollers 52*b* before the original document sheet S is further conveyed.

The first original document conveying passage 52 includes the first scanning roller 66 and the pair of document output rollers 52*e*. The first scanning roller 66 is disposed facing the upward side of the DF exposure glass 42 to read an image formed on the original document sheet S. The pair of document output rollers 52*e* is disposed immediate upstream from the document outlet port 55*b* in the document conveying direction to eject the original document sheet S from the document outlet port 55*b* toward the original document output tray 53.

The first original document conveying passage 52 includes the first scanning roller 66 and the pair of document output rollers 52*e*. The first scanning roller 66 is disposed facing the upward side of the DF exposure glass 42 to read an image formed on the original document sheet S. The pair of document output rollers 52*e* is disposed immediate upstream from the document outlet port 55*b* in the document conveying direction to eject the original document sheet S from the document outlet port 55*b* toward the original document output tray 53.

The original document conveying passage 52 includes a second scanning unit 68 that is disposed downstream from the first scanning roller 66 in the document conveying direction and between the first scanning roller 66 and the pair of document output rollers 52*e*, along a passage where the original document sheet S is conveyed relatively linearly.

The second scanning unit 68 includes a second scanner 69 and a second scanning roller 70. The second scanner 69 functions as a scanner to read an image formed on a back face of the original document sheet S and a back face of the card C. The second scanning roller 70 is disposed facing the second scanner 69 across the straight conveying passage 61.

The second scanner 69 uses a contact image sensor so as to read the image formed on the back face of the original document sheet S and the back face of the card C after the image on the back face of the original document sheet S and the back face of the card C has been read by an imaging unit 44 of the image scanner 4.

The second scanning roller 70 prevents lifting of the original document sheet S and the card C in the second scanner 69. At the same time, the second scanning roller 70 functions as a reference white to obtain shading data of the second scanner 69. It is to be noted that, when an image formed on the back face of the original document sheet S and an image formed on the back face of the card C is not read, the original document sheet S and the card C pass through the second scanner 69 without stopping. The second scanning roller 70 maintains an appropriate distance with the second scanner 69 with the aid of a gap adjusting mechanism by which a distance (a conveyance gap) between the second scanner 69 and the original document sheet S or the card C is appropriately adjusted to meet a focal depth that does not deteriorate image quality.

Next, a description is given of document conveyance operations of the original document sheet S.

FIG. 8A is a diagram illustrating document conveyance operations of the original document sheet S via the U-turn conveying passage 56*b* of the original document conveying passage 52 in the ADF 5 according to an embodiment of this disclosure. FIG. 8B is a diagram illustrating another document conveyance operations of the original document sheet S via the straight conveying passage 61 of the original document conveying passage 52 in the ADF 5 according to an embodiment of this disclosure.

Firstly, a description is given of a document reversing conveyance operation of the original document sheet S with reference to FIG. 8A.

In the above-described configuration, when an image formed on the original document S is read, the bundle of original document sheets S is set on the original document tray 51. As a print key provided to a instruction input unit 150 is pressed, an uppermost original document sheet S of the bundle of original document sheets S is firstly fed to the original document conveying passage 52. Then, the subsequent original document sheets S sequentially follow the uppermost original document sheet S. Then, as illustrated in FIG. 8A, the original document sheet S that has been set on the original document tray 51 is fed to the original document conveying passage 52 via the document inlet port 55*a*, the original document sheet S is turned along the U-turn conveying passage 56*b*. Thereafter, when the original document sheet S passes over the upper face of the DF exposure glass 42, the first face (for example, the front face) of the original document sheet S is read by the single unit optical scanning unit 47 that functions as an image sensor while the original document sheet S is caused to closely contact with the DF exposure glass 42 by a pressing force applied by the first scanning roller 66.

Further, in a case in which the second face (for example, the back face) of the original document sheet S is read, when the original document sheet S passes the second scanner 69, the image formed on the second face of the original document sheet S is read by the second scanner 69 while the original document sheet S is caused to closely contact with the second scanner 69 by a pressing force applied by the second scanning roller 70. After the image on the second face (for example, the back face) of the original document sheet S has been read, the original document sheet S is output onto the original document output tray 53 via the document outlet port 55b by the pair of document output rollers 52e.

Next, a description is given of a document linear conveyance operation of the original document sheet S with reference to FIG. 8B.

The straight conveying passage 61 permits conveyance of a small original document sheet smaller than the smallest size original document sheet S (for example, a postcard size sheet) that is settable on the original document tray 51, specifically, a thick resin card such as a bank card and credit card. That is, the straight conveying passage 61 extends entirely on the same plane. At the same time, the straight conveying passage 61 is provided with the pair of scan entrance rollers 52d, the first scanning roller 66, the second scanning roller 70, and the pair of document output rollers 52e disposed at intervals equal to or smaller than a longitudinal size or a lateral size of the card C.

With this configuration, when an image formed on the card C is read, the bypass tray 73 is rotated to open the document feeding port 72, as illustrated in FIG. 8B.

In this state, the card C or a bundle of cards C is set on the bypass tray 73. As the print key on the instruction input unit 150 is pressed, the uppermost card C of the bundle of cards C is firstly fed to the card conveying passage 75 via the document feeding port 72. Then, the subsequent cards C sequentially follow the uppermost card C. Thereafter, as illustrated in FIG. 8B, when the card C passes over the upper face of the DF exposure glass 42, an image formed on the first face (for example, the front face) of the card C is read by the single unit optical scanning unit 47 while the card C is caused to closely contact with the DF exposure glass 42 by the pressing force applied by the first scanning roller 66.

Further, in a case in which the second face (for example, the back face) of the card C is read, when the card C passes the second scanner 69, the image formed on the second face of the card C is read by the second scanner 69 while the card C is caused to closely contact with the second scanner 69 by the pressing force applied by the second scanning roller 70. After the image on the back face of the card C has been read, the card C is output onto the original document output tray 53 via the document outlet port 55b by the pair of document output rollers 52e.

As described above, the ADF 5 according to an embodiment of this disclosure includes the original document conveying passage 52 and the straight conveying passage 61. The original document conveying passage 52 conveys the original document sheet S picked up via the document inlet port 55a. The straight conveying passage 61 extends from the document feeding port 72 to the document outlet port 55b via the second scanner 69. The whole range of the straight conveying passage 61 is located on the same plane. By including the original document conveying passage 52 and the straight conveying passage 61, the ADF 5 can reduce the size of the housing and the time to read an image. At the same time, the ADF 5 can read a small and thick resin card and meet a variety of scanning and reading of original document sheets including the small and thick resin card.

Figure 9:
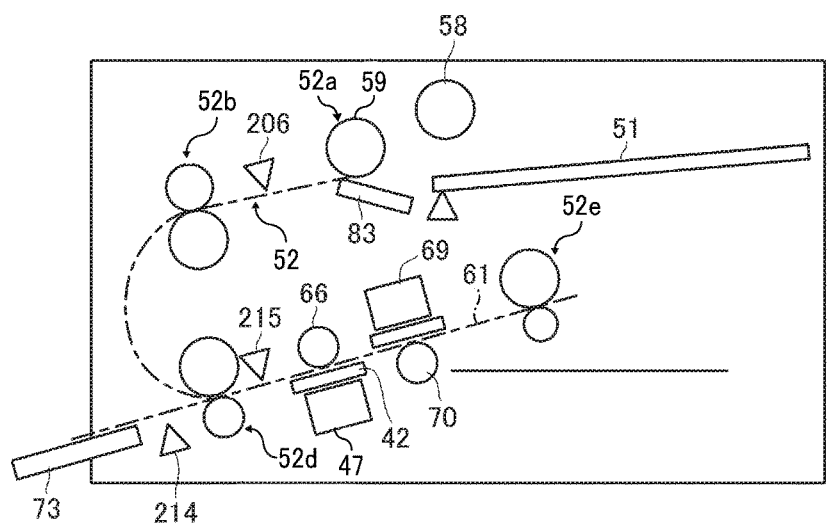
FIG. 9 is a diagram illustrating sheet feeding operations of the original document sheet via the U-turn conveying passage and the straight conveying passage of the original document conveying passage in the automatic document feeder according to an embodiment of this disclosure.

Next, a description is given of document conveyance control performed by the ADF 5, with reference to FIG. 9.

When an original document sheet S is set on the bypass tray 73 while another original document sheet S set on the original document tray 51 is being conveyed, it is likely to cause a paper jam. The document conveyance control is executed to reduce a burden of labor to handle such a paper jam.

First, a description is given of an operation during regular document conveyance in which the original document sheet S set on the original document tray 51 is conveyed.

A bundle of original document sheets S is set on the original document tray 51 of the ADF 5. A document set sensor 202 is provided to function as a detector to detect whether or not a bundle of original documents is placed on the original document tray 51. The bundle of original documents is conveyed by the pickup roller 58 to the document separation unit 52a via the document feed roller 59, where multiple original documents S fed to the document separation unit 52a are separated and conveyed further one by one. A distance between a proceeding sheet and a subsequent sheet of the serially conveyed original document sheets S is detected by a post-feed sensor 206. Based on the detection result, an electromagnetic clutch may stop rotation of the document feed roller 59 and rotation of the pickup roller 58. By so doing, the distance between the adjacent original document sheets S can be controlled.

The original document sheet S is conveyed to a reading portion 81 by the pair of pullout rollers 52b and the pair of scan entrance rollers 52d. After the single unit optical scanning unit 47 that functions as a first scanner and the second scanner 69 have read images on both the front and back sides of the original document sheet S, the original document sheet S is conveyed via the second scanning roller 70 and the pair of document output rollers 52e and then ejected to the original document output tray 53.

Here, the reading portion 81 indicates a position near the single unit optical scanning unit 47 and the second scanner 69 provided on the original document conveying passage 52.

The pair of pullout rollers 52b is disposed near the bypass tray 73 and functions as a document conveying body and a document holding and conveying body to convey the original document sheet S in the original document conveying passage 52 and hold the original document sheet S loaded on the bypass tray 73. With this configuration, when compared with a configuration in which a separate roller is provided to hold the original document sheet S loaded on the bypass tray 73 different from a document conveying roller, the configuration of the ADF 5 according to the present embodiment of this disclosure can reduce the number of parts and the size of the housing of the ADF 5.

A description is given of conveyance of the original document sheet S loaded on the card supplying bypass tray 73 of the ADF 5.

When setting the original document sheet S including the card C via the card supplying bypass tray 73, the original document sheet S is supplied from the card supplying bypass tray 73 until the original document sheet S abuts against the pair of scan entrance rollers 52d. On this setting the original document sheet S, a bypass feed set sensor 214 turns ON. After a predetermined period of time has been elapsed since the turn ON of the bypass feed set sensor 214, the pair of scan entrance rollers 52d starts rotating. When the original document sheet S has been moved to a registration sensor 215, the original document sheet S is stopped. By abutting the original document sheet S against the pair of scan entrance rollers 52d, skew of the original document sheet S is corrected. The bypass feed set sensor 214 functions as a detector in this disclosure.

Thereafter, as the print key on the instruction input unit 150 is pressed, the original document sheet S is conveyed to the reading portion 81. After the single unit optical scanning unit 47 has read the image on the front face of the original document sheet S and the second scanner 69 has read the image on the back face of the original document sheet S, the original document sheet S is conveyed via the second scanning roller 70 and the pair of document output rollers 52e and then ejected to the original document output tray 53.

Next, a description is given of an operation during document conveyance in which the original document sheet S are set on both the original document tray 51 and the bypass tray 73.

When the original document sheet S is set to the bypass tray 73 during the regular document conveyance of the original document sheet S from the original document tray 51 and the bypass feed set sensor 214 is turned to ON, the electromagnetic clutch is turned to OFF. Then, the rotations of the pickup roller 58 and the document feed roller 59 connected to the electromagnetic clutch are stopped. With this stop of the rotations of the pickup roller 58 and the document feed roller 59, the document conveyance of the original document sheet S loaded on the original document tray 51 is stopped. Consequently, document conveying rollers other than the pickup roller 58 and the document feed roller 59 continues the rotations without stopping.

With this operation, on the turning ON of the bypass feed set sensor 214, the original document sheet S being conveyed on the upstream side in the document conveying direction of the original document conveying passage 52 before the pair of pullout rollers 52b is stopped there.

By contrast, the original document sheet S having been conveyed on the downstream side in the document conveying direction of the original document conveying passage 52 have successfully reached the pair of pullout rollers 52b. The original document sheet S is not stopped there but is continuously conveyed via the pair of pullout rollers 52b and the rollers disposed downstream from the pair of pullout rollers 52b in the document conveying direction. Eventually, the original document sheet S is ejected to the original document output tray 53.

Further, in a case in which the original document sheet S set to the bypass tray 73 has already been abutted against the pair of scan entrance rollers 52d on the turning ON of the bypass tray document set sensor 214, the original document sheet S is continuously conveyed, without stopping, via the pair of pullout rollers 52b and the rollers disposed downstream from the pair of pullout rollers 52b in the document conveying direction. Then, the original document sheet S is ejected to the original document output tray 53.

According to the above-described conveyance control, the original document sheet S is not left in the vicinity of the reading portion 81 in the original document conveying passage 52. Therefore, a paper jam handling by which the original document sheet S left near the reading portion 81 is removed from the original document conveying passage 52 is not performed. As a result, the burden of labor to perform the paper jam handling can be reduced or eliminated.

Even when the above-described conveyance control is performed, the original document sheet S being conveyed upstream from the pair of pullout rollers 52b in the original document conveying passage 52 is left in the ADF 5. However, this original document sheet S is different from the original document sheet S to remain near the reading portion 81 and can be removed easily by opening the cover 55.

Further, the image forming apparatus 1 according to an embodiment of this disclosure includes the straight conveying passage 61. Therefore, even when two original document sheets S are conveyed at one time, the two original document sheets S can be conveyed to the original document output tray 53.

After completion of ejection of the original document sheet(s) S set on the original document tray 51 and on the bypass tray 73, each of the document conveying rollers is stopped. Then, an alert message is displayed on a display of the instruction input unit 150, indicating that original documents are simultaneously set on the original document tray 51 and the bypass tray 73 by mistake and encouraging that the original document sheet S is set again on a correct tray.

One of reasons to indicate such an alert message is to encourage another setting (a correct setting) of the original document sheet S since the original document sheet S before reaching the pair of pullout rollers 52b is forcedly stopped there. In this case, the cover 55 is opened to remove the original document sheet S stopped in the original document conveying passage 52, and then the original document sheet S is set on the original document tray 51 again.

Another reason to notify with the alert message is to prevent incorrect image reading on both the front and back sides of the original document sheet S in a case in which an original document sheet S set on the original document tray 51 and a different original document sheet S set on the bypass tray 73 are conveyed simultaneously while one overlaid on another.

Further, the original document sheet S is not stopped in the image forming apparatus 1 but is discharged to the original document output tray 53 in the same manner as the regular document conveyance. Therefore, the alert message is also indicated to prevent misunderstanding that the original document sheet S is successfully read even when images on both the front and back sides of the original document sheet S are not read correctly.

According to the above-described reasons, after the above-described document conveyance control has been performed and the original document sheet S has been ejected, the alert message is displayed on the display of the instruction input unit 150 to encourage the original document sheet S to be set again correctly. Instead of the display of the alert message on the instruction input unit 150, audio guidance may be employed to indicate the correct setting of the original document sheet S.

Further, the image forming apparatus 1 includes a facsimile mode capable of transmission of images read in a facsimile mode from the original document sheet S. When the bundle of original document sheets S is set on the original document tray 51 and, at the same time, information of the original document sheet S is sent via facsimile, in a case in which a plastic card including information such as a drivers license card and a health insurance card is set on the bypass tray 73, it is likely to send out the information by mistake. In order to address this inconvenience, the ADF 5 according to the present embodiment of this disclosure causes the original document sheet S to be conveyed to the original document output tray 53 in a state in which the image reading is stopped on the turning ON of the bypass feed set sensor 214.

The above-described document conveyance control is performed in the present embodiment due to the following reasons.

In a comparative image reading device, two document sheet trays are provided to set original document sheets thereon. When original document sheets are loaded on both document sheet trays, the comparative image reading device performs the following control. When the bundle of original document sheets is set on the document sheet tray while another original document sheet is being fed from the bypass tray, an electromagnetic clutch causes a pickup roller and a feed roller to stop, so that the document conveyance from the document sheet tray is interrupted and the document conveyance from the bypass tray is continuously performed.

Accordingly, the original document sheet from the document sheet tray and the original document sheet from the bypass tray do not collide, and therefore no paper jam occurs.

By contrast, when the original document sheet is set on the bypass tray while the bundle of original documents set on the document sheet tray is being conveyed and an image formed on each original document sheet is read, the scan entrance roller can feed both the original document sheet from the document sheet tray and the original document sheet from the bypass tray. Therefore, it is likely that these original document sheets contact with each other, resulting in a paper jam. In order to avoid such collision of multiple original document sheets in the comparative image reading device, when an original document sheet is set to the bypass tray during regular document conveyance from the document sheet tray, a bypass document set sensor is turned on, and a drive motor that rotates the document conveying rollers is stopped. Then, the conveyance of the original document sheet conveyed from the document sheet tray is controlled to stop due to occurrence of a document paper jam.

However, even when the above-described document conveyance control is performed, in a case in which an original document sheet is set on the bypass tray with great force, the original document sheet cannot stop, and therefore it is likely that the original document sheet is conveyed by the scan entrance roller and stopped in the middle of the document conveying passage. In this case, conveyance of the original document sheet is stopped in the middle of the document conveying passage, and therefore the original document sheet is removed from the document conveying passage. Such a paper jam puts a burden of labor to a user.

By contrast, in the document conveyance control performed in the image reading device according to the present embodiment of this disclosure, even when the original document sheets are set on both the document sheet tray and the bypass tray, the original document sheets located downstream from the pair of pullout rollers 52*b* in the document conveying direction of the original document conveying passage 52 are conveyed to the original document output tray 53. Therefore, no paper jam handling to remove the original document sheet(s) from the original document conveying passage 52 occurs.

Figure 10:
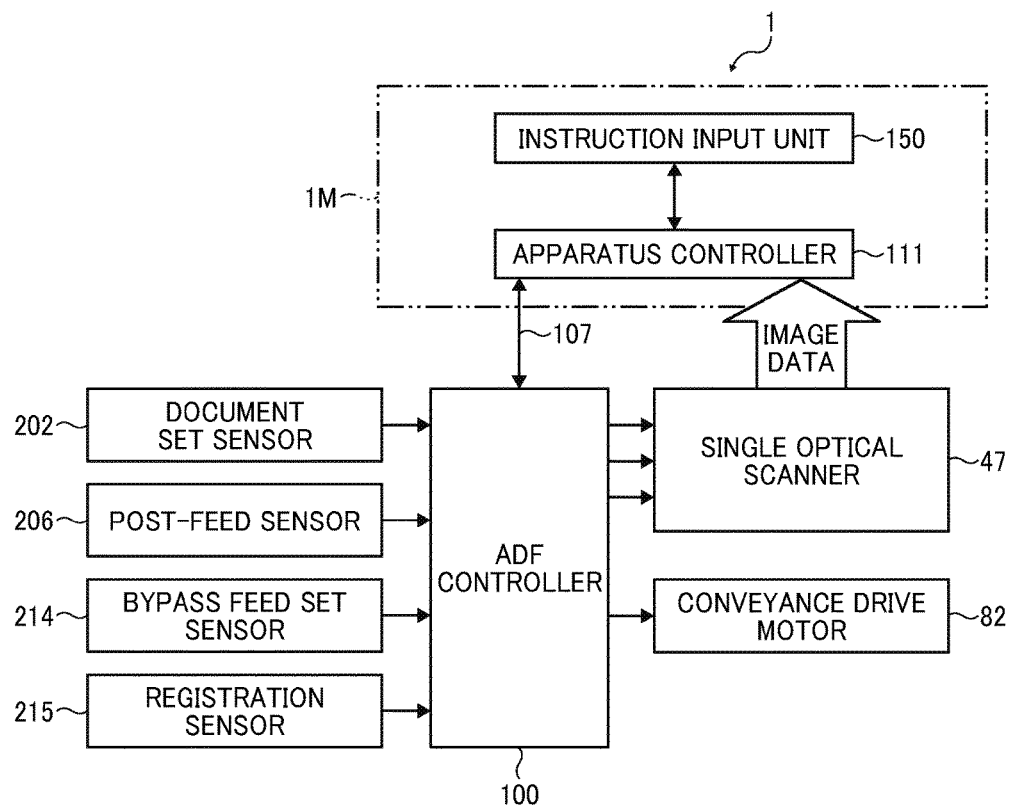
FIG. 10 is a block diagram illustrating a control part of the image forming apparatus according to an embodiment of this disclosure.

FIG. 10 is a block diagram illustrating the configuration of a control part of the image forming apparatus 1 according to this disclosure.

As illustrated in FIG. 10, the image forming apparatus 1 further includes an ADF controller 100, an apparatus controller 111, and the instruction input unit 150. The ADF controller 100 controls operations performed by the ADF 5. The apparatus controller 111 controls operations performed by the devices provided in a housing of the image forming apparatus 1. The instruction input unit 150 is connected to the apparatus controller 111 to receive instructions to be transmitted to the apparatus controller 111.

The ADF controller 100 is connected to the document set sensor 202, the post-feed sensor 206, a bypass feed set sensor 214, the bypass feed set sensor 214, and the registration sensor 215, as illustrated in FIG. 10. The ADF controller 100 receives various detection signals from these sensors. The ADF controller 100 executes the single unit optical scanning unit 47 and the conveyance drive motor 82 to drive the pickup roller 58, the document feed roller 59, the pair of pullout rollers 52*b*, the pair of scan entrance rollers 52*d*, the first scanning roller 66, the second scanning roller 70, and the pair of document output rollers 52*e*. The conveyance drive motor 82 functions as a drive source according to this disclosure.

The ADF controller 100 and the apparatus controller 111 are connected via an interface (I/F) 107. As the print key of the instruction input unit 150 is pressed down, the apparatus controller 111 issues a document feeding signal to feed the original document sheet S, a reading start signal to start reading the image data of the original document sheet S, and a reading stop signal to stop reading the image data of the original document sheet S, and sends a selected signal of the document feeding signal, the reading start signal, and the reading stop signal to the ADF controller 100 via the I/F 107.

Figure 11:
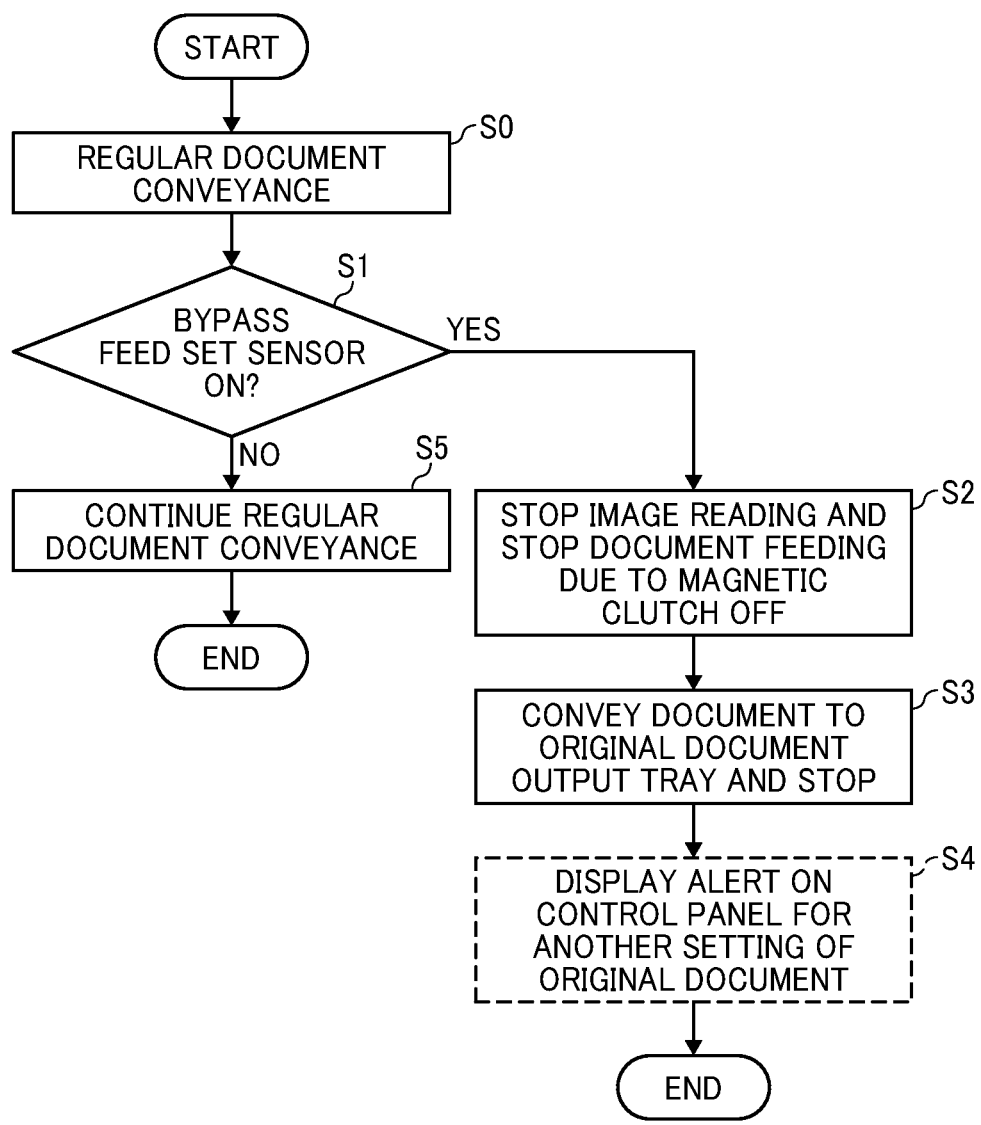
FIG. 11 is a flowchart of document conveyance control of the image forming apparatus according to an embodiment of this disclosure.

Now, a description is given of the document conveyance control according to the present embodiment of this disclosure with reference to FIG. 11.

FIG. 11 is a flowchart of the regular document conveyance control of the image forming apparatus 1 according to the present embodiment of this disclosure.

During the regular document conveyance of the original document sheet S, in step S0, the ADF controller 100 determines whether or not the bypass feed set sensor 214 is ON during the document conveyance of the original document sheet S, in step S1. The "during the regular document conveyance" indicates a state in which the original document sheet S set on the original document tray 51 is being conveyed in the original document conveying passage 52.

When the bypass feed set sensor 214 is ON (YES in step S1), the ADF controller 100 causes the single unit optical scanning unit 47 and the second scanner 69 to stop reading the image on the original document sheet S and, at the same time, causes the electromagnetic clutch is turned OFF. Then, the ADF controller 100 causes the pickup roller 58 and the document feed roller 59 connected to the electromagnetic clutch to stop rotating, so as to stop a document feeding operation and the image reading operation, in step S2.

When the bypass feed set sensor 214 is OFF (NO in step S1), the ADF controller 100 causes the conveyance drive motor 82 to continue driving of the document conveying rollers, so as to continue the regular document conveyance, in step S5. Then, the ADF controller 100 finishes this document conveyance control. After the document feeding operation and the image reading operation have been stopped in step S2, the ADF controller 100 causes the original document sheet S to be conveyed to the original document output tray 53 and to stop the conveyance of the original document sheet S, in step S3. Then, the ADF controller 100 causes the instruction input unit 150 to display an alert message on the display so as to encourage another setting of the original document sheet S, in step S4. The, the ADF controller 100 finishes this document conveyance control.

As described above, the image forming apparatus 1 according to the present embodiment of this disclosure includes the original document tray 51, the bypass tray 73, the pickup roller 58, the document feed roller 59, the original document conveying passage 52, the conveyance drive motor 82, and the document set sensor 202. The original document tray 51 loads the original document sheets S thereon. The bypass tray 73 also loads the original document sheets S thereon. The pickup roller 58 picks up the original document sheets S one by one. The document feed roller 59 feeds the original document sheet S picked up by the pickup roller 58. The original document sheets S pass through the original document conveying passage 52 from the original document tray 51 to the original document output tray 53. The conveyance drive motor 82 rotates the pair of pullout rollers 52*b*, the pair of scan entrance rollers 52*d*, the first scanning roller 66, the second scanning roller 70, and the pair of document output rollers 52*e*, each roller to convey the original document sheet S fed in the original document conveying passage 52. The document set sensor 202 detects that the original document sheet S is loaded on the bypass tray 73. The bypass tray 73 can load one original document sheet S thereon. The bypass tray 73 can load one original document sheet S thereon. The pair of scan entrance rollers 52*d* that is provided in the vicinity of the bypass tray 73 also holds the original document sheet S. When the document set sensor 202 detected the original document sheet S during the document conveyance of the original document sheet S loaded on the original document tray 51, the pickup roller 58 and the document feed roller 59 stop feeding the original document sheets S loaded on the original document tray 51, and each of the pickup roller 58 and the document feed roller 59 conveys the original document sheets S traveling downstream from the pair of pullout rollers 52*b* in the document conveying direction to the original document output tray 53. After the original document sheets S have been conveyed to the original document output tray 53, the ADF controller 100 causes the conveyance drive motor 82 to stop driving.

According to this configuration, in the image forming apparatus 1 according to the present embodiment of this disclosure, when the original document tray 51 is set on the bypass tray 73 while another original document sheet S that is set to the original document tray 51 is being conveyed during the document conveyance, the bypass feed set sensor 214 detects the original document sheet S on the bypass tray 73, and the ADF controller 100 causes the document conveyance from the bypass tray 73. With this stop of the document conveyance of the original document sheet S, after the document conveying rollers have conveyed the original document sheets S traveling the downstream side from the pair of pullout rollers 52*b* to the original document output tray 53, the conveyance of the original document sheets S is stopped. Therefore, even when different original document sheets S are loaded on the different two original document sheet trays, respectively, the original document sheets S are conveyed in a state in which no original document sheet S is left near the reading portion in the image reading device. Therefore, the burden of labor to handle such a paper jam is reduced or eliminated, and therefore the usability of the image forming apparatus 1 can be enhanced.

Further, while some known image reading devices employ a single roller to function as both a scan entrance roller provided in the second document sheet tray and a document conveying roller provided in a regular document conveying passage through which an original document sheet is conveyed from the first document sheet tray, some other known image reading devices employ different rollers, one functioning as the scan entrance roller and another functioning as the document conveying roller. In a case in which two separate rollers are provided to the image reading device, while the original document sheet is being conveyed from the first document sheet tray, the rotation of the scan entrance roller in the second document sheet tray can be stopped. However, in a case in which the scan entrance roller in the second document sheet tray is separately provided as a different roller from the document conveying roller, the manufacturing cost increases due to an increase in the number of parts and, at the same time, the image reading device cannot reduce the size.

In the present embodiment of this disclosure, the pair of scan entrance rollers 52*d* that is one of the document conveying rollers also functions to hold the original document sheet S set to the bypass tray 73, and therefore the size of the image forming apparatus 1 can be reduced.

Alternatively, the image forming apparatus 1 may cause the ADF controller 100 to stop reading the images when the bypass feed set sensor 214 detected that the original document sheet S is set on the bypass tray 73. As described above, in a case in which a plastic card including information such as a drivers license card and a health insurance card is set on the bypass tray 73 while information of the original document sheet S that has been set on the original document tray 51 is being sent via facsimile, it is likely to send out the information by mistake. However, this configuration of the image forming apparatus 1 according to the present embodiment of this disclosure can prevent from unintentionally sending information such as the above-described confidential information and resulting in leakage of confidential information.

Further, after the ADF controller 100 has stopped driving the conveyance drive motor 82, the image forming apparatus 1 may issue an alert indicating image reading failure or document conveyance failure via the audio guidance (voice) or a visual guidance on the display of the instruction input unit 150. According to this configuration, even though the original document sheets S may be stopped at the upstream side from the pair of pullout rollers 52*b* during the document conveyance and be set to the original document tray 51 again, by issuing the alert via the audio guidance or the visual guidance on the display of the instruction input unit 150, the image reading failure or the document conveyance failure can be recognized. Further, since the original document sheets S are output without being left in the housing of the image forming apparatus 1 even when separate original documents S are set on two original document trays (i.e., the original document tray 51 and the bypass tray 73) simultaneously, it can prevent that a user misunderstands that the image reading has been successfully performed.

Consequently, the configurations according to the embodiments of this disclosure can provide an automatic document feeder that can reduce the manufacturing cost and the size, eliminate the burden of labor of paper jam handling by user(s), and enhance the usability, an image reading device including the automatic document feeder, and an image forming apparatus including the image reading device. Accordingly, this disclosure is useful for general automatic document feeders, image reading devices, and image forming apparatuses.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:
1. An automatic document feeder comprising:
 a first document tray and a second document tray, each configured to load a plurality of original document sheets thereon;

a document feeding body configured to feed the plurality of original document sheets one by one from the first document tray;

a document output tray configured to receive the plurality of original document sheets to be output;

a document conveying passage between the document feeding body and the document output tray;

multiple document conveying bodies in the document conveying passage, each configured to convey the plurality of original document sheets through the document conveying passage, the multiple document conveying bodies including a document holding and conveying body, the document holding and conveying body being in the vicinity of the second document tray and configured to convey the plurality of original document sheets in the document conveying passage, and hold the plurality of original document sheets loaded on the second document tray;

a drive source configured to drive the multiple document conveying bodies;

a detector configured to detect that at least one of the plurality of original document sheets is loaded on the second document tray; and a controller configured to control the drive source, on detection that a second sheet of the plurality of original document sheets is loaded on the second document tray during document conveyance of first and third sheets of the plurality original document sheets from the first document tray, the controller is further configured to stop a document feeding operation of the third sheet from the first document tray, cause the multiple document conveying bodies to convey the first sheet downstream from the document holding and conveying body to the document output tray, and stop driving the drive source after the first sheet has been conveyed to the document output tray.

2. The automatic document feeder according to claim 1, further comprising:

wherein the controller is further configured to stop an operation of an optical scanner reading an image formed on the first sheet when the detector detects that the second sheet is set on the second document tray.

3. The automatic document feeder according to claim 1, wherein the controller is further configured to issue an alert indicating either one of an image reading failure and a document conveyance failure via one of an audio guidance and a visual guidance on a control panel after stopping the driving of the drive source.

4. An image reading device comprising the automatic document feeder according to claim 1.

5. An image forming apparatus comprising:

the image reading device according to claim 4; and an image forming device configured to form an image based on image data read by the image reading device.

6. The automatic document feeder according to claim 2, wherein the controller is further configured to stop the operation of the optical scanner in response to determining that the image is to be transmitted via facsimile.

7. The automatic document feeder according to claim 1, wherein the second document tray is further configured to move to one of a first position in which the second document tray is configured to load the plurality of original document sheets thereon, and a second position in which the second document tray forms a portion of the document conveying passage.

8. The automatic document feeder according to claim 1, wherein the document conveying passage includes a curved passage and a straight passage.

9. The automatic document feeder according to claim 8, wherein the second sheet is conveyed through the straight passage without being conveyed through the curved passage, and the first sheet is conveyed through both the curved passage and the straight passage.

10. The automatic document feeder according to claim 9, wherein the document feeding body includes a first pair of rollers, and the document holding and conveying body includes a second pair of rollers.

11. The automatic document feeder according to claim 10, wherein the third sheet is upstream of the first pair of rollers and the first sheet is downstream of the first pair of rollers on detection that the second sheet is loaded on the second document tray.

12. The automatic document feeder according to claim 10, wherein the second sheet is conveyed using the second pair of rollers without using the first pair of rollers, and the first sheet is conveyed using both the first pair of rollers and the second pair of rollers.

13. The automatic document feeder according to claim 10, wherein on detection that the second sheet is loaded on the second document tray during document conveyance of the first and third sheets from the first document tray, the controller is further configured to cause the multiple conveying bodies to convey both the first and second sheets downstream from the document holding and conveying body to the document output tray if the second sheet is abutted against the second pair of rollers.

14. The automatic document feeder according to claim 1, wherein the second sheet is smaller and more rigid than the first and third sheets.

15. An image reading device, comprising:

an automatic document feeder, including a first document tray and a second document tray, each configured to load a plurality of original document sheets thereon, a document feeding body configured to feed the plurality of original document sheets one by one from the first document tray, a document output tray configured to receive the plurality of original document sheets to be output, a document conveying passage between the document feeding body and the document output tray, multiple document conveying bodies in the document conveying passage, each configured to convey the plurality of original document sheets through the document conveying passage, the multiple document conveying bodies including a document holding and conveying body, the document holding and conveying body being in the vicinity of the second document tray and configured to convey the plurality of original document sheets in the document conveying passage, and hold the plurality of original document sheets loaded on the second document tray, a drive source configured to drive the multiple document conveying bodies, a detector configured to detect that at least one of the plurality of original document sheets is loaded on the second document tray, and a controller configured to control the drive source, on detection that a second sheet of the plurality of original document sheets is loaded on the second document tray during document conveyance of first and third sheets of the plurality original document sheets from the first document tray, the controller is further configured to stop a document feeding operation of the third sheet from the first document tray, cause the multiple document conveying bodies to convey the first sheet downstream from the document holding and conveying body to the document output tray, and stop driving the drive source after the first sheet has been conveyed to the document output tray; and a first optical scanner proximate to the document conveying passage, the first optical scanner configured to read an image on each of the plurality of original document sheets during conveyance of the plurality of original document sheets through the document conveying passage.

16. The image reading device according to claim 15, wherein the first optical scanner is further configured to read the image on each of the plurality of original document sheets by performing line scanning.

17. The image reading device according to claim 15, wherein the first optical scanner is proximate to a transparent reading portion in the document conveying passage.

18. The image reading device according to claim 15, further comprising a second optical scanner, the first optical scanner further configured to read a first image on a first face of each of the plurality of original document sheets and the second optical scanner configured to read a second image on a second face of each of the plurality of original document sheets.

19. An image forming apparatus, comprising:

the image reading device according to claim 15; and an image forming device configured to form an image based on the image read by the first optical scanner.

* * * * *